(12) United States Patent
Andrews et al.

(10) Patent No.: US 8,495,190 B2
(45) Date of Patent: Jul. 23, 2013

(54) PROVIDING ACCESS BY A CLIENT APPLICATION PROGRAM OVER AN INTERNET PROTOCOL (IP) NETWORK TO A SERVER APPLICATION PROGRAM INSTANCE

(75) Inventors: Pauline E. Andrews, Southampton (GB); Robert Harris, Christchurch (GB); Dennis L. Plum, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 12/418,652

(22) Filed: Apr. 6, 2009

(65) Prior Publication Data

US 2009/0327486 A1 Dec. 31, 2009

(30) Foreign Application Priority Data

Jun. 25, 2008 (EP) .................... 08159010

(51) Int. Cl.
*G06F 15/16* (2006.01)
(52) U.S. Cl.
USPC ............ 709/223; 703/223; 703/224; 703/227
(58) Field of Classification Search
USPC ................................. 709/223, 227
See application file for complete search history.

(56) References Cited

U.S. PATENT DOCUMENTS

| | | | |
|---|---|---|---|
| 7,454,489 B2* | 11/2008 | Chauffour et al. | 709/223 |
| 2002/0143953 A1* | 10/2002 | Aiken, Jr. | 709/227 |
| 2003/0115344 A1* | 6/2003 | Tang et al. | 709/229 |
| 2004/0122980 A1 | 6/2004 | Boden | |
| 2006/0047791 A1* | 3/2006 | Bahl | 709/220 |
| 2006/0165074 A1 | 7/2006 | Modi et al. | |
| 2006/0212549 A1 | 9/2006 | Hokkyo et al. | |
| 2009/0240795 A1* | 9/2009 | Tsirtsis et al. | 709/223 |

FOREIGN PATENT DOCUMENTS

| | | |
|---|---|---|
| JP | 16-075036 A | 9/2005 |
| JP | 17-222914 A | 2/2007 |

OTHER PUBLICATIONS

Hidekazu, Suzuki, et al., "External Dynamic Mapping Method for NAT Traversal", Communications and INformation Technologies, ISCIT '07, International Symposium on, IEEE, PI, XP031166556, pp. 723-728 (Oct. 1, 2007).
Hans Schwibinger, EPO Examiner, Examination Report for Application No. EP09769104.2, May 27, 2011, pp. 1-9, European Patent Office, The Netherlands.
Author Unknown, Examiner, State Intellectual Property Office of the People's Republic of China (SIPO), Office Action for Chinese Application No. 200980117524.6 (English translation not available), Nov. 5, 2012, pp. 1-10, China.
Jie Huang, et al., Network Address Translation and Its Applications, Article: Journal of Nanjing University of Posts and Telecommunications, Dec. 2001, vol. 21, No. 4, pp. 87-90, Nanjing, China.

(Continued)

*Primary Examiner* — Djenane Bayard
(74) *Attorney, Agent, or Firm* — Lee Law, PLLC; Christopher B. Lee (57) ABSTRACT

A method, apparatus and software is disclosed in which a temporary IP address is assigned to a selected instance of a server application program so as to provide processing continuity for processing with a client application program.

25 Claims, 6 Drawing Sheets

OTHER PUBLICATIONS

Masahiko Takahashi, et al., Implementation of Process Migration with TCP Session Continuity suitable for Data Center Environments, IPSJ SIG Technical Report, Jun. 17, 2004, pp. 29-36, vol. 2004, No. 63, Information Processing Society of Japan, Japan.

Hidekazu Suzuki, et al., Proposal and Implementation of NAT-f for Realizing NAT Traversal Communication with External Dynamic Mapping Method, IPSJ Journal, Dec. 2007, pp. 3949-3961, vol. 48, No. 12, Information Processing Society of Japan, Japan.

* cited by examiner

| Client Plug-in Application Instruction | Response |
|---|---|
| Provide_Affinity_Address | New Affinity address provided |
| Release_Affinity_Address | Specified Affinity address released |

Figure 4

| Server Application Instruction | Response |
|---|---|
| Get_Affinity_Address | New Affinity address provided |
| Free_Affinity_Address | Specified Affinity address freed |
| Enquire_Affinity_Address | Returns all Affinity addresses currently in use by current server |
| Browse_Affinity_Address | Show all Affinity address known to IP stack |

PROVIDING ACCESS BY A CLIENT APPLICATION PROGRAM OVER AN INTERNET PROTOCOL (IP) NETWORK TO A SERVER APPLICATION PROGRAM INSTANCE

FIELD OF THE INVENTION

The present invention relates to a method, apparatus, or software for providing access by a client application program over an Internet Protocol (IP) network to a server application program instance.

BACKGROUND OF THE INVENTION

In client/server computer systems, in order to provide increased server system bandwidth, a number of instances of a server application program may be provided. All instances of the server application program share the same IP address and are arranged to accept communications on the same network port. A network port is an identification number used to pair incoming network data traffic to a given process or application running on the receiving computer. In other words, several instances of the server application program are active and waiting upon the IP address and port used by a given client application program. When a client application program connects to the IP address and port, one of the server instances is selected to establish a connection with the client application program.

During the subsequent interaction between the client application program and the selected instance of the server application program, data or other objects are likely to be created within the persistent storage for a selected instance of the server application program. Further steps in the processing may be dependent on such data or objects. Therefore, in order to preserve such objects, the connection between the client application program and the selected instance of the server application program must be maintained.

One problem is that if the connection is removed or lost, the client application program will be unable to reconnect to the same instance of the server application program and elements of the created data or objects may be lost. Furthermore, maintaining the connection requires significant network and server computer resources.

SUMMARY OF THE INVENTION

An embodiment of the invention provides a method for providing access by a client application program over an Internet Protocol (IP) network to a server application program instance, the method comprising: a) providing IP network access for a plurality of instances of a server application program via a common port for a first IP address; b) enabling a connection of a client application program to a selected one of the plurality of server application program instances via the first IP address in response to a first request from the client application program; c) assigning a second IP address to the selected server application program instance for communication to the client application program, the second IP address being exclusive to the selected server application program instance; d) providing IP network access to the selected server application program instance via the second IP address; and e) enabling the reconnection of the client application program to the selected instance of the server application program via the second IP address.

The second IP address may be provided in response to a request from the selected instance of the server application program. The request from the selected instance of the server application program may be made in response to a corresponding request from the client application program. The second IP address may be selected from a predetermined set of unused IP addresses. The predetermined set of unused IP addresses may be determined from a set used IP address obtained from one or more relevant Domain Name Servers (DNSs). When the processing between the client application program and the selected instance of the server application program is completed, the second IP address may be freed for further use. The second IP address may be freed in response to a request from the client application program. The IP network and addresses may be IP version 6 (IPv6) compliant.

Another embodiment provides a method for providing access by a client application program over an Internet Protocol (IP) network to a server application program instance, the method comprising: a) connecting to a selected one of a plurality of instances of a server application program via a common port for a first IP address; b) requesting a second IP address from the selected server application program instance, the second IP address being exclusive to the selected server application program instance; c) in response to a receipt of the second IP address, closing the connection with the selected server application program instance; and d) reconnecting to the selected instance of the server application program via the second IP address.

A further embodiment provides a method for a server application program instance to provide a connection for a client application program over an Internet Protocol (IP) network, the method comprising: a) monitoring a port for a first IP address in common with a plurality of other instances of a server application program; b) in response to a first request from a client application program connecting to the client application program via the first IP address to provide a first connection; c) in response to a second request from the client application program acquiring a second IP address exclusive to the server application program instance and communicating the second IP address to the client application program; d) in response to a third request from the client application program closing the first connection; e) monitoring a port for the second IP address; and f) in response to a fourth request from the client application program reconnecting to the client application program via the second IP address.

Another embodiment provides apparatus for providing access by a client application program over an Internet Protocol (IP) network to a server application program instance, the apparatus being operable to: provide IP network access for a plurality of instances of a server application program via a common port for a first IP address; enable a connection of a client application program to a selected one of the plurality of server application program instances via the first IP address in response to a first request from the client application program; assign a second IP address to the selected server application program instance for communication to the client application program, the second IP address being exclusive to the selected server application program instance; provide IP network access to the selected server application program instance via the second IP address; and enable the reconnection of the client application program to the selected instance of the server application program via the second IP address.

A further embodiment provides apparatus for providing access by a client application program over an Internet Protocol (IP) network to a server application program instance, the apparatus being operable to: connect to a selected one of a plurality of instances of a server application program via a common port for a first IP address; request a second IP address from the selected server application program instance, the second IP address being exclusive to the selected server application program instance; in response to the receipt of the second IP address, close the connection with the selected server application program instance; and reconnect to the selected instance of the server application program via the second IP address.

Another embodiment provides apparatus for a server application program instance to provide a connection for a client application program over an Internet Protocol (IP) network, the apparatus being operable to: monitor a port for a first IP address in common with a plurality of other instances of a server application program; in response to a first request from a client application program, connect to a the client application program via the first IP address to provide a first connection; in response to a second request from the client application program, acquire a second IP address exclusive to the server application program instance and communicate the second IP address to the client application program; in response to a third request from the client application program, close the first connection; monitor a port for the second IP address; and in response to a fourth request from the client application program, reconnect to the client application program via the second IP address.

A further embodiment provides a computer program product loadable into the internal memory of a digital computer, comprising software code portions for performing, when the product is run on a computer, a method for providing access by a client application program over an Internet Protocol (IP) network to a server application program instance, the method comprising: a) providing IP network access for a plurality of instances of a server application program via a common port for a first IP address; b) enabling a connection of a client application program to a selected one of the plurality of server application program instances via the first IP address in response to a first request from the client application program; c) assigning a second IP address to the selected server application program instance for communication to the client application program, the second IP address being exclusive to the selected server application program instance; d) providing IP network access to the selected server application program instance via the second IP address; and e) enabling the reconnection of the client application program to the selected instance of the server application program via the second IP address.

Another embodiment provides a computer program product loadable into the internal memory of a digital computer, comprising software code portions for providing, when the product is run on a computer, an apparatus for providing access by a client application program over an Internet Protocol (IP) network to a server application program instance, the apparatus being operable to: provide IP network access for a plurality of instances of a server application program via a common port for a first IP address; enable a connection of a client application program to a selected one of the plurality of server application program instances via the first IP address in response to a first request from the client application program; assign a second IP address to the selected server application program instance for communication to the client application program, the second IP address being exclusive to the selected server application program instance; provide IP network access to the selected server application program instance via the second IP address; and enable the reconnection of the client application program to the selected instance of the server application program via the second IP address.

Embodiments of the invention use a feature of the IPv6 protocol which allows a given server to have many IP addresses. This feature can be used to allocate a unique temporary IP address by a server instance for a particular client in order to provide the ability for the client to re-establish access to that particular server instance without having to keep open the socket/connection to the server. Thus, the router and other physical resources required to keep such a socket/connection open may instead be made available for other users. At a later time, the client will be able to reopen contact with the specific server program instance previously used through use of the allocated IP address.

BRIEF DESCRIPTION OF THE DRAWINGS

Embodiments of the invention will now be described, by way of example only, with reference to the accompanying drawings.

DETAILED DESCRIPTION OF THE INVENTION

Figure 1:
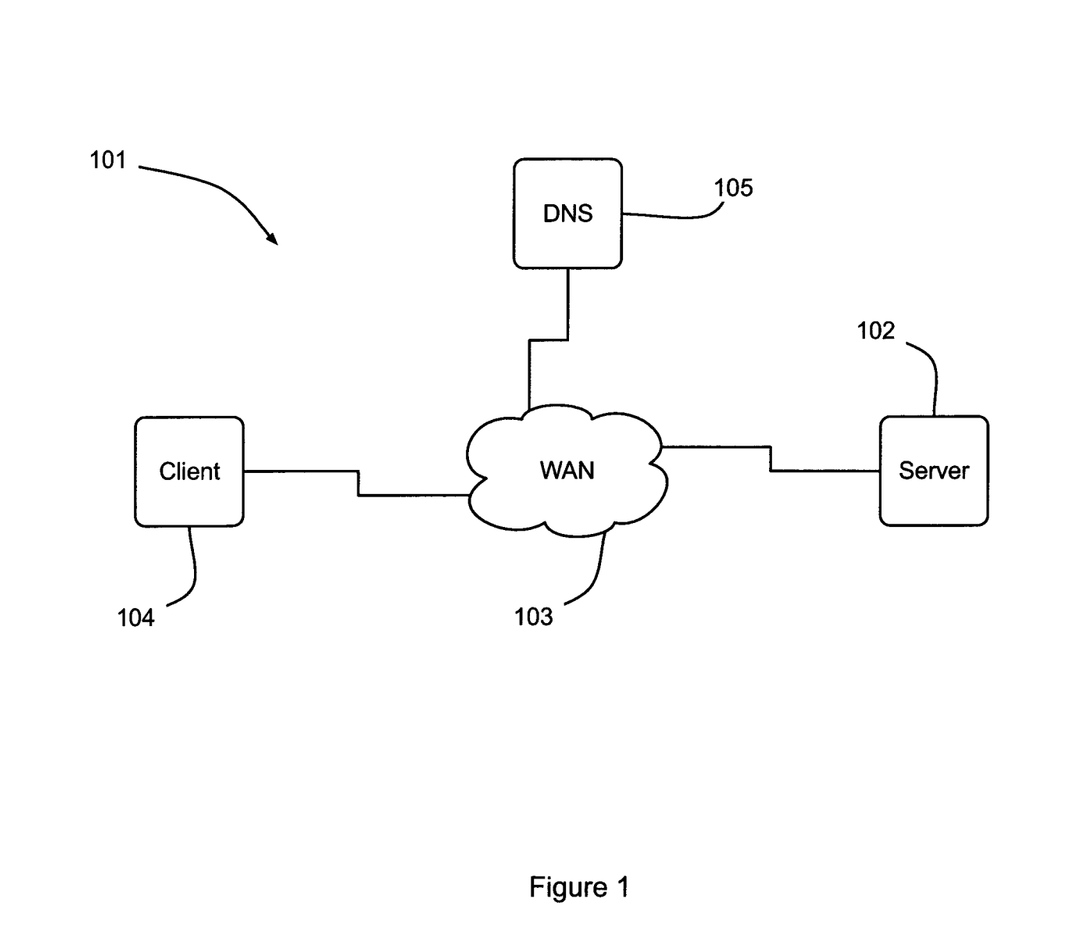
FIG. 1 is a schematic illustration of a networked computer system.

With reference to FIG. 1, a computer system 101 comprises a server computer 102 connected to a Wide Area Network (WAN) 103 along with a client computer 104 and a Domain Name Server (DNS) 105. The server computer 102 and client computer 104 are arranged with software arranged to enable communication across the network 103 using the Transmission Control Protocol/Internet Protocol (TCP/IP) communications protocol. In the present embodiment, TCP/IP version 6 (IPv6) protocol is used. IPv6 addresses are written as eight groups of four hexadecimal digits separated by colons and are typically composed of two logical parts: a 64-bit network prefix, and a 64-bit host part. The host part is commonly used to address an instance of a server application program and can by dynamically changed, that is, a server resource may, from time to time, effectively change its IPv6 address. The DNS 105 provides translation of network addresses in the form of Universal Resource Locators (URLs), such as www.ibm.com, into an IPv6 addresses, such as a129:e4e2:d5c6:b216:1c22:6ff2:57ab:9e12.

Figure 2:
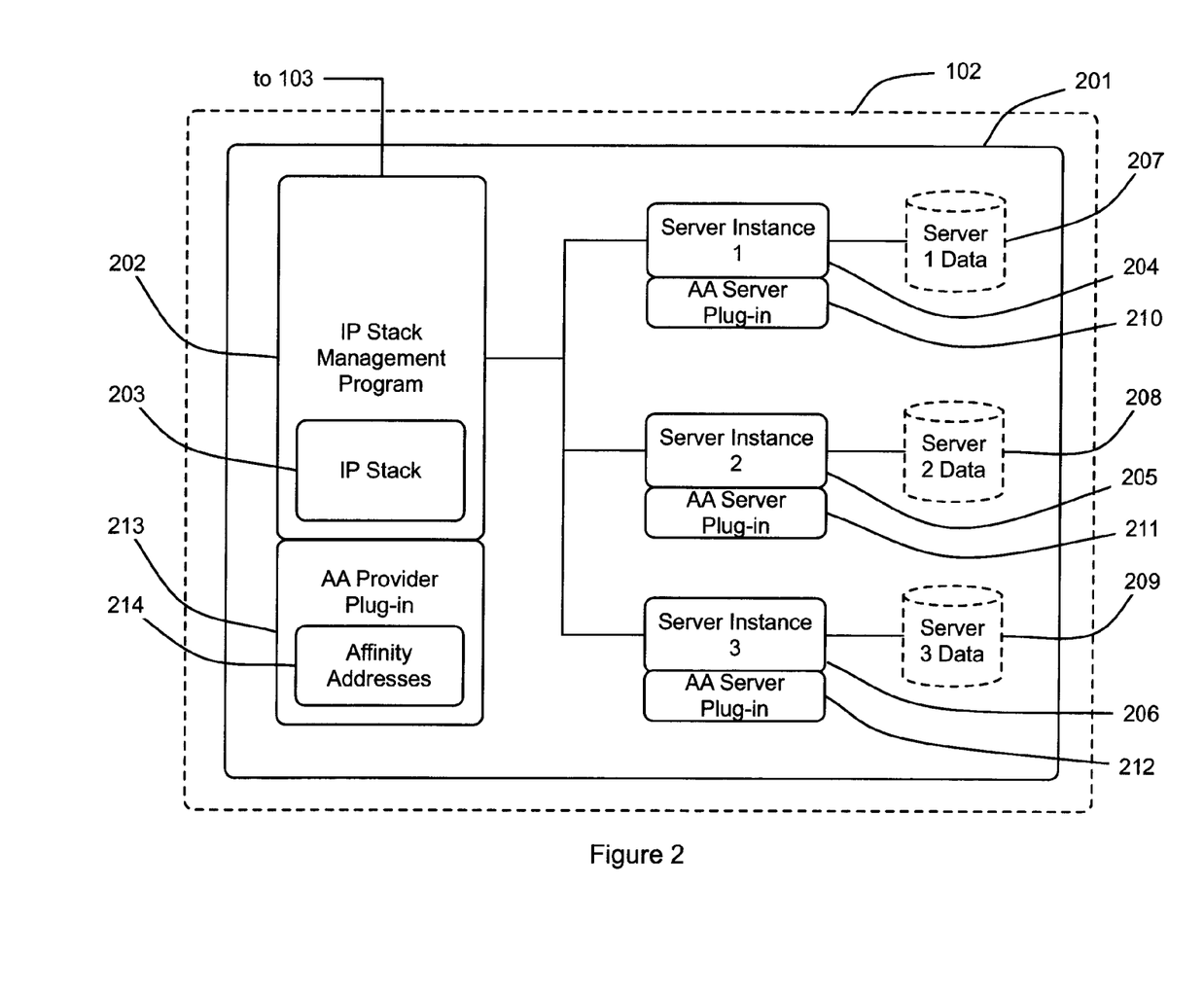
FIG. 2 is a schematic illustration of software components for a server computer in the computer system of FIG. 1.

FIG. 2 shows the software components of the server computer 102 in further detail. The server computer 102 is running an operating system 201, which, in the present embodiment, is the z/OS® operating system from International Business Machines Corporation (IBM). The operating system 201 is provided with an IP stack management program 202 in the form of the z/OS Communications Manager, arranged to provide an IP network interface that enables the operating system 201 to provide IP network access to resident programs. Three instances of a server application program 204, 205, 206 are running on the operating system 201, which, in the present embodiment, are instances of the IBM®

CICS® Transaction Server (CICS) application program. Each instance of the server application program 204, 205, 206 has a common IP address and is arranged to listen on a common port provided by the IP stack management system 202 so as to provide high server availability. Thus in response to a request from the client computer 104 for access to an instance of the server application program 204, 205, 206, one instance the server application program 204, 205, 206 is selected at random and connected with the client computer 105. During the subsequent processing between the client computer 104 and the selected instance of the server application program 204, 205, 206, the data or other objects 207, 208, 209 that may be created are stored in the persistent storage for the selected instance of the server application program 204, 205, 206. Such data 207, 208, 209 defines an affinity or relationship between the client computer 104 and the selected instance of the server application program 204, 205, 206.

Figure 3:
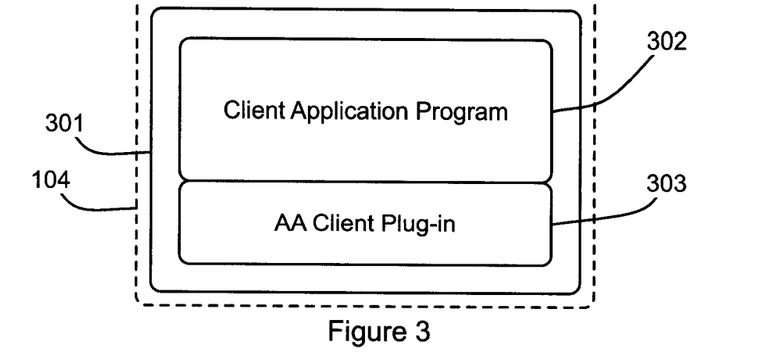
FIG. 3 is a schematic illustration of software components for a client computer in the computer system FIG. 1.

FIG. 3 shows the software components of the client computer 104 in further detail. The client computer 104 is running an operating system 301 providing a platform for a client application program 302 in the form of a web browser application program. The web browser 302 provides user access, via the IP network 103, to the services provided by instances of the server application program 204, 205, 206. The web browser 302 further comprises a plug-in program extension referred to herein as an affinity address (AA) client plug-in 303. The AA client plug-in 303 is arranged to provide the web browser 302 with functionality for requesting that the IP address for a given instance of the server application program 204, 205, 206 to which the web browser 302 is connected, be reassigned to a new IP address that is unique to the given instance of the server application program 204, 205, 206. This new IP address is, herein, termed an affinity address (AA). The feature of the IPv6 protocol, which enables a given server to have multiple IPv6 addresses, is utilised. An IPv6 address is of the form a: b: c: d: w: x: y: z, where a, b, c, d, w, x and y are hex-as-character entries from 0000 to FFFF. In effect the a: b: c: d part of the IPv6 address is used for routers to direct an item through the network, and the w: x: y: z portion is used to identify the server which is communicating with the router. The server can request a unique temporary IPv6 address. Typically, the a: b: c: d: part of the affinity address of a server application program will be the same as that part of the first IP address of a server application program, with the w: x: y: z part being changed to an address which is currently unallocated.

When the AA client plug-in 303 receives a requested affinity address it is arranged to close its current connection to the given instance of the server application program 204, 205, 206 and reconnect to the same instance via the received affinity address. This reconnection enables the relevant processing context, that is the data 207, 208, 209, to be preserved without the need to constantly maintain a connection between client application program 302 and given instance of the server application program 204, 205, 206.

Figure 4:
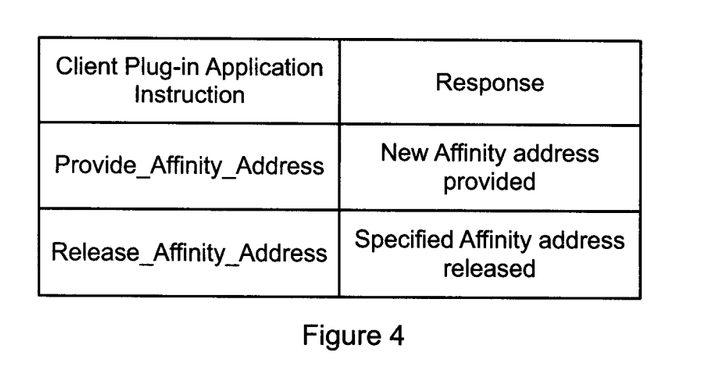
FIG. 4 is a table illustrating instructions for use between the client and server computers in the computer system of FIG. 1.

FIG. 4 shows the requests available to the AA client plug-in 303 by an Application Program Interface (API) provided with the instances of the server application program 204, 205, 206. The first request (Provide_Affinity_Address) is for the instance of the server application program 204, 205, 206 to provide a new affinity address, which, as described above, results in a new affinity address being provided to the AA client plug-in 303. The second request (Release_Affinity_Address) is for the instance of the server application program 204, 205, 206 to release a given affinity address. This results in the given instance of the server application program 204, 205, 206 being shut down and the affinity address released by the IP stack management program 202 for potential further use. In other words, the affinity addresses provided in this manner may only be temporarily assigned to a given instance of the server application program 204, 205, 206.

In the present embodiment, the API between the AA client plug-in 303 and the server application program 204 is provided via an extension to the Hypertext Transfer Protocol (HTTP) version 1.1 Options command. The Options command is used to transport the Provide and Release requests and responses between the AA client plug-in 303 and respective instances of the server application program 204, 205, 206 as HTTP message headers. Thus for example, in order to request an affinity address, the AA client plug-in 303 sends an HTTP message including a header named Provide_Affinity_Address. The response from a respective instance of the server application program 204, 205, 206 will be an HTTP message including the header name Affinity_Address:1:2:3:4:5:6:7:8, where 1:2:3:4:5:6:7:8 is the requested affinity address.

Returning to FIG. 2, each instance of the server application program 204, 205, 206 further comprises a plug-in program extension referred to herein as an affinity address (AA) server plug-in 210, 211, 212. In addition, the communications manager 202 further comprises a plug-in program extension referred to herein as an affinity address (AA) provider plug-in 213. Each instance of the AA server plug-in 210, 211, 212 is arranged to provide functionality to a given instance of the server application program 204, 205, 206 for routing requests between the AA client plug-in 303 and the AA provider plug-in 213. The AA provider plug-in 213 is arranged to provide functionality to the communications manager 202 for identifying and managing a set of affinity addresses 214 and for supplying unique affinity addresses on request. The management of the affinity addresses comprises obtaining a list of all relevant used IP addresses from the DNS 105 and deducing the set of available addresses, that is, the set of possible affinity addresses. Furthermore, in response to requests to provide or release affinity addresses, the AA provider plug-in 213 is arranged to update the availability status of the affinity address respectively both in the set of affinity addresses 214 and with the DNS 105.

Figure 5:
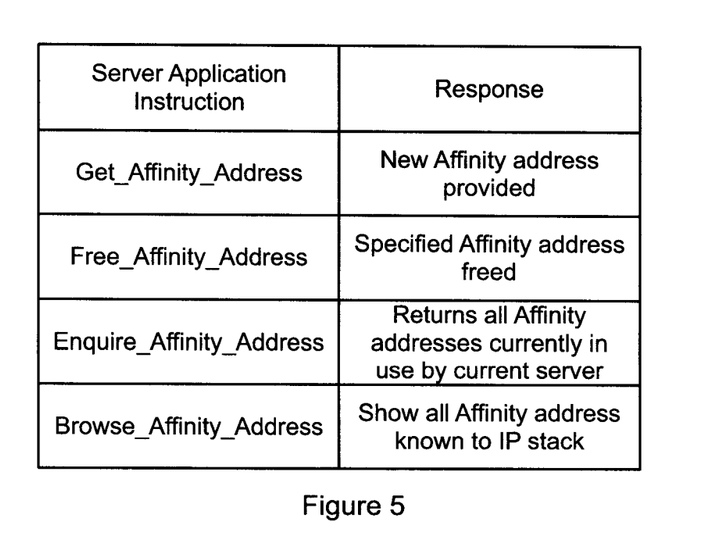
FIG. 5 is a table illustrating instructions for use between software components of the server computer of FIG. 2.

FIG. 5 shows the requests provided to each instance of the AA server plug-in 210, 211, 212 by the API provided with the AA provider plug-in 213. The first request (Get_Affinity_Address) is issued by the AA server plug-in 210, 211, 212 to the AA provider plug-in 213 in response to a Provide_Affinity_Address request received from the AA client plug-in 303. In response, the AA provider plug-in 213 selects an affinity address, marks the selected address as unavailable and returns the selected address to the AA server plug-in 210, 211, 212. The selected affinity address is then passed to the requesting AA client plug-in 303 and also assigned to the given instance of the server application program 204, 205, 206 to enable the reconnection of the client application program 302 and the instance of the server application program 204, 205, 206 via the affinity address. The second request (Free_Affinity_Address) in the API of FIG. 5 is issued by the AA server plug-in 210, 211, 212 to the AA provider plug-in 213 in response to a Release_Affinity_Address request received from the AA client plug-in 303. In response, the AA provider plug-in 213 marks the freed affinity address as available. The third and fourth requests are provided as part of a management interface for the AA provider plug-in 213 and respectively enable all affinity address in use by a given server and all known affinity addresses in the IP stack to be discovered.

Figure 6:
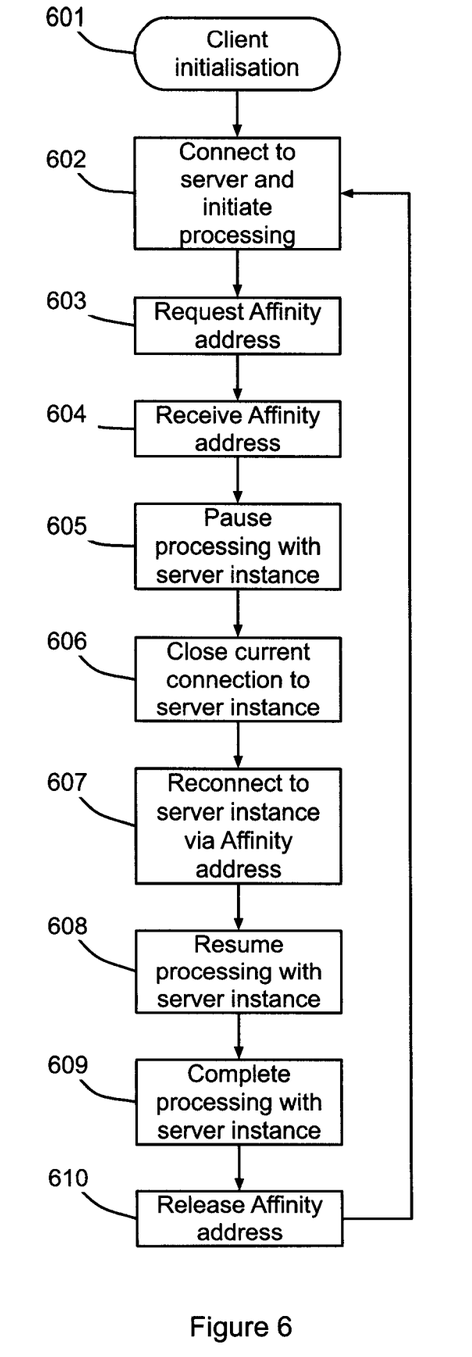
FIG. 6 is a flow chart illustrating processing performed by a client application program for the client computer of FIG. 3.

The processing performed by the AA client plug-in 303 in combination with the client application program 302 will now be described in further detail with reference to the flow chart of FIG. 6. At step 601, processing of the AA client plug-in 303 is initiated in response to the initialisation of the client application program 302 and processing moves to step 602. At step 602, a connection is made to a randomly selected instance of the server application program (Server Instance 1 in FIG. 2) 204, over the IP network 103 and processing between the client and server programs 302, 204 is initiated. Processing then moves to step 603 where a request for the provision of an affinity address is sent to the selected instance of the server application program 204 and processing moves to step 604. At step 604, the requested affinity address is awaited and once received processing moves to step 605. At step 605, the processing between the client and server programs 302, 204 is temporarily suspended and processing moves to step 606. At step 606, the current connection with selected instance of the server application program 204 is closed, thereby freeing up all the resources for the communication, and processing moves to step 607. At step 607, a new connection is made to the same selected instance of the server application program 204 via the received affinity address and processing moves to step 608. At step 608, the processing between the client and server programs 302, 204 is resumed and processing moves to step 609. At step 609, the completion of the processing between the client and server programs 302, 204 is awaited and once completed processing moves to step 610. At step 610, a request to release the received affinity address is sent to the server application program 204 and processing returns to step 602 to await the initiation of a further connection to a server.

It is to be noted that in prior art situations, rather than closing the connection in step 606, the current connection with a selected instance of the server application program 205 must be kept active, with the communication resources continuing to be allocated and thus unavailable for use by others.

Figure 7:
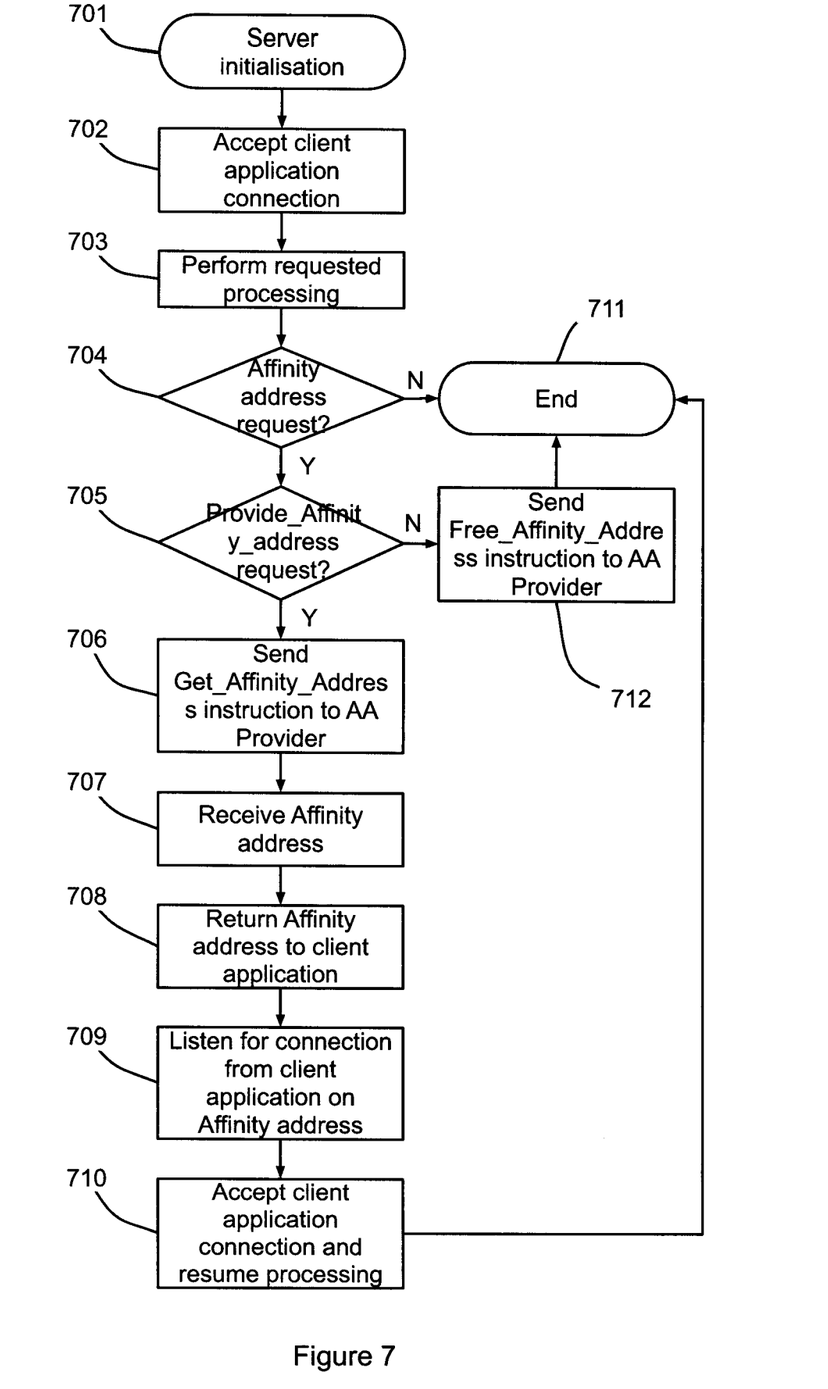
FIG. 7 is a flow chart illustrating processing performed by an instance of a server application program for the server computer of FIG. 3.

The processing performed by an instance of the AA server plug-in 210, 211, 212 in combination with an associated instance of the server application program 204, 205, 206 will now be described in further detail with reference to the flow chart of FIG. 7. At step 701, the processing of an instance of the AA server plug-in 210 is initiated in response to the initialisation of the associated instance of the server application program 204 and processing moves to step 702. At step 702, a requested connection from the client application program 302 is received and accepted and processing moves to step 703. At step 703, the processing between the client and server applications 302, 204 is performed and continues until either an affinity address related request is received from the client application program 302 or until processing is terminated at which point processing moves to step 704. At step 704, if an affinity address related request has been received processing continues to step 705. If at step 705 the request is identified as a request for the provision of an affinity address processing moves to step 706. At step 706, a request for a new affinity address is sent to the AA provider plug-in 213 and processing moves to step 707 to await receipt of the new affinity address. Once the affinity address is received processing moves to step 708. At step 708, the received affinity address is passed back to the requesting client application program 302 and processing moves to step 709. At step 709, the new affinity address is assigned to the current instance of the server application program 204, which then listens on the affinity address for a reconnection request from the client application program 302 and once received processing moves to step 710 where the reconnection is established and processing between the client and server application programs 302, 204 is resumed. When processing between the client and server application programs 302, 204 is terminated processing moves to step 711 and ends for this instance of the server application program 204. If at step 704 the received request is a request to terminate the processing between the client and server application programs 302, 204 then processing moves to step 711 and ends as described above. If at step 705 the received affinity address related request is a request to release a current affinity address then processing moves to step 712 where the appropriate request is sent to the AA provider plug-in 213 and processing then moves to step 711 and ends as described above.

Figure 8:
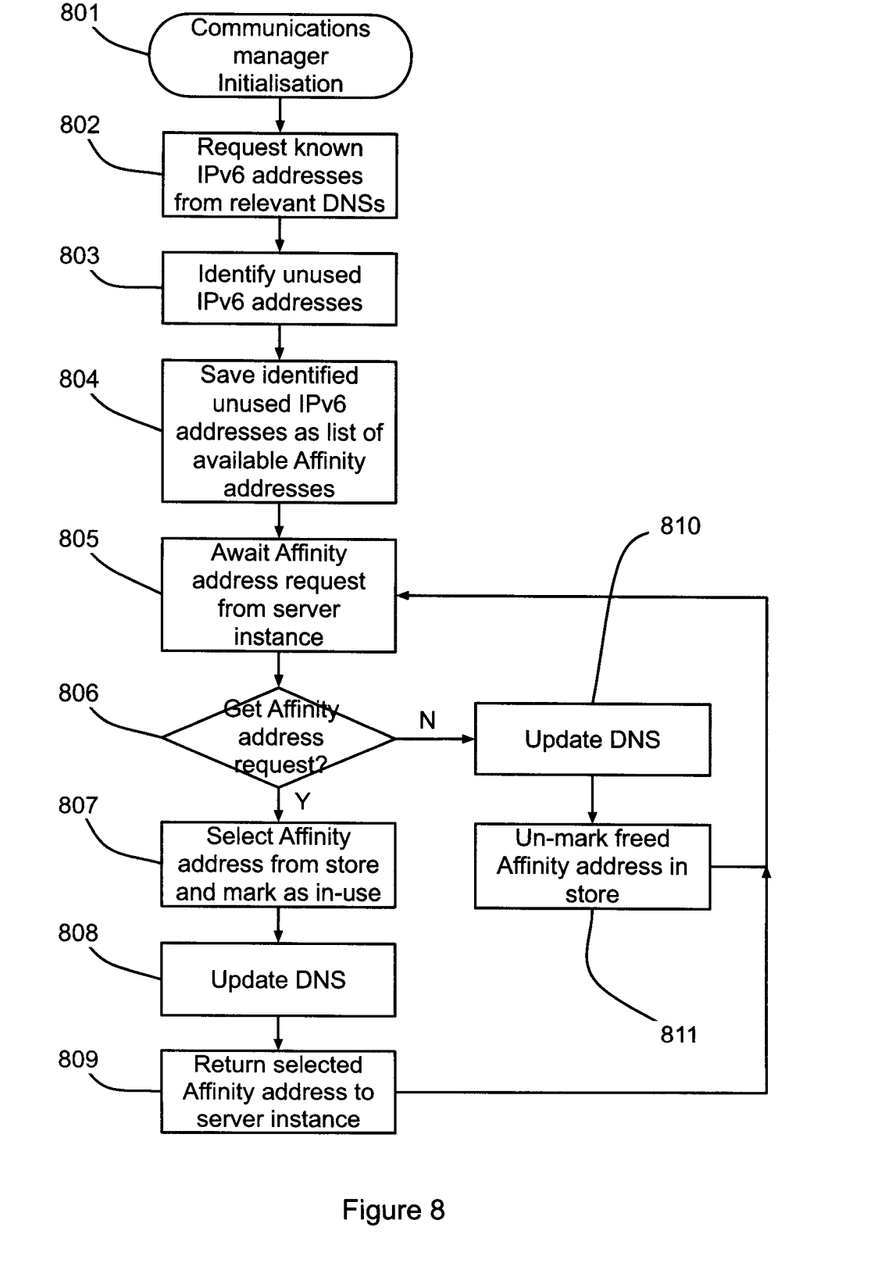
FIG. 8 is a flow chart illustrating processing performed by an IP stack management program for the server computer of FIG. 2.

The processing performed by the AA provider plug-in 213 in combination with the IP stack management program 202 will now be described in further detail with reference to the flow chart of FIG. 8. At step 801, the processing of the AA provider plug-in 213 is initiated in response to the initialisation of the processing of the IP stack management program 202 and processing moves to step 802. At step 802, a list of all currently used IPv6 addresses is collected from the DNS 105 and processing moves to step 803. At step 803, a list of unused IPv6 address is deduced from the list of currently used IPv6 addresses and processing moves to step 804. At step 804, the list of unused IPv6 addresses is saved as the set of possible affinity addresses 214 and processing moves to step 805. At step 805, processing waits for an affinity address request from an instance of a server application program 204 and once received processing moves to step 806. If at step 806, the request is to provide a new affinity address then processing moves to step 807. At step 807, an address is selected from the set of affinity addresses 214 and marked as in use and processing moves to step 808. At step 808, the DNS 105 is informed that the affinity address is in use and processing moves to step 809. At step 809, the selected affinity address is returned to the requesting instance of the server application program 204 and processing moves to step 805 to await the receipt of a further affinity address related request. If at step 806, the request is for the release of an in-use affinity address then processing moves to step 810. At step 810, the DNS 105 is updated accordingly and processing moves to step 811. At step 811, the freed affinity address is marked as available in the set of affinity addresses 214 and processing returns to step 805 and proceeds as described above.

As will be understood by those skilled in the art, while embodiments of the invention are described with respect to IPv6, other embodiments may use other protocols with suitable mechanisms for dynamically assigning unique network addresses to a given instance of an application program. Furthermore, while embodiments of the invention are described with respect to TCP, other network transport protocols suitable protocols such as User Datagram Protocol (UDP) may be substituted or used in combination with TCP in some embodiments.

In the above embodiments, the selection of and instance of a server application program for connection to a requesting client application program is made at random. As will be understood by those skilled it the art, other criteria such as server workload balancing or failover mechanisms may contribute at least in part to the selection of a given instance of the server application program.

In the above embodiment, functionality is added to the client and server application programs and the IP stack management program using a respective program function extension or plug-in. As will be understood by those skilled in the art, the functions provided by any of the plug-ins described above may be provided instead by any other suitable means such as by adding to or modifying the code for the original client or server application programs or the IP stack management program. The functions of the server and provider plug-ins described herein may also be provided by or incorporated into other suitable programs within the respective systems, for example by the addition of appropriate affinity address server and provider routines.

In the above embodiment, the DNS provides a list of used IP addresses from which the AA provider plug-in derives and then manages the set of available affinity addresses (AAs). In other embodiments, the management of the pool of AAs may be performed solely by the DNS. In another embodiment, the management of the pool of AAs may be shared between the DNS and the AA provider plug-in.

In an embodiment, given an IPv6 address with the form a:b:c:d:e:f:g:h where the a:b:c:d part is fixed, elements of the non-fixed part are reserved for indicating that an address is an affinity address. In this embodiment, the DNS need not be involved in the selection or management of affinity addresses.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices. Further, a computer program product loadable into the internal memory of a digital computer can be used, comprising software code portions for performing, when the product is run on a computer, a method in accordance with the present invention While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described.

For the avoidance of doubt, the term "comprising", as used herein throughout the description and claims is not to be construed as meaning "consisting only of".

The invention claimed is:

1. A method for providing access by a client application program over an Internet Protocol (IP) network to a server application program instance, the method comprising the steps of:
 a) providing IP network access for a plurality of instances of a server application program via a common port for a first IP address;
 b) enabling a connection of a client application program to a selected one of the plurality of server application program instances via the first IP address in response to a first request from the client application program;
 c) assigning a second IP address to the selected server application program instance for communication to the client application program, the second IP address being exclusive to the selected server application program instance;
 d) providing IP network access to the selected server application program instance via the second IP address; and
 e) enabling the reconnection of the client application program to the selected instance of the server application program via the second IP address.

2. The method according to claim 1, wherein the second IP address is provided in response to a request from the selected instance of the server application program.

3. The method according to claim 2, wherein the request from the selected instance of the server application program is made in response to a corresponding request from the client application program.

4. The method according to claim 1, wherein the second IP address is selected from a predetermined set of unused IP addresses.

5. The method according to claim 4, wherein the predetermined set of unused IP addresses is determined from a set used IP address obtained from one or more relevant Domain Name Servers (DNSs).

6. The method according to claim 4, wherein, when the processing between the client application program and the selected instance of the server application program is completed, the second IP address is freed for further use.

7. The method according to claim 6, wherein the second IP address is freed in response to a request from the client application program.

8. The method according to claim 1, wherein the IP network and addresses are IP version 6 (IPv6) compliant.

9. A computer program product comprising a storage device with stored software code portions loadable into an internal memory of a digital computer for performing, when executed by the digital computer, the method as claimed in claim 1.

10. A method for providing access by a client application program over an Internet Protocol (IP) network to a server application program instance, the method comprising:
 a) connecting to a selected one of a plurality of instances of a server application program via a common port for a first IP address;
 b) requesting a second IP address from the selected server application program instance, the second IP address being exclusive to the selected server application program instance;
 c) in response to the receipt of the second IP address, closing the connection with the selected server application program instance; and
 d) reconnecting to the selected instance of the server application program via the second IP address.

11. The method according to claim 10, further comprising: requesting that the selected server application program instance free the second IP address in response to completion of processing with the selected server application program instance.

12. A computer program product comprising a storage device with stored software code portions loadable into an internal memory of a digital computer for performing, when executed by the digital computer, the method as claimed in claim 10.

13. A method for a server application program instance to provide a connection for a client application program over an Internet Protocol (IP) network, the method comprising:
 a) monitoring a port for a first IP address in common with a plurality of other instances of a server application program;
 b) in response to a first request from a client application program connecting to a the client application program via the first IP address to provide a first connection;
 c) in response to a second request from the client application program acquiring a second IP address exclusive to the server application program instance and communicating the second IP address to the client application program;

d) in response to a third request from the client application program closing the first connection;

e) monitoring a port for the second IP address; and f) in response to a fourth request from the client application program reconnecting to the client application program via the second IP address.

14. A computer program product comprising a storage device with stored software code portions loadable into an internal memory of a digital computer for performing, when executed by the digital computer, the method as claimed in claims 13.

15. An apparatus for providing access by a client application program over an Internet Protocol (IP) network to a server application program instance comprising:

a communication interface; and a processor programmed to:

provide IP network access for a plurality of instances of a server application program via a common port for a first IP address via the communication interface;

enable a connection of the client application program to a selected one of the plurality of server application program instances via the first IP address in response to a first request from the client application program;

assign a second IP address to the selected server application program instance for communication to the client application program, the second IP address being exclusive to the selected server application program instance;

provide IP network access to the selected server application program instance via the second IP address; and enable reconnection of the client application program to the selected instance of the server application program via the second IP address.

16. The apparatus according to claim 15, where the processor is programmed to provide the second IP address in response to a request from the selected instance of the server application program.

17. The apparatus according to claim 16, where the processor is programmed to make the request from the selected instance of the server application program in response to a corresponding request from the client application program.

18. The apparatus according to claim 15, where the processor is programmed to select the second IP address from a predetermined set of unused IP addresses.

19. The apparatus according to claim 18, where the processor is programmed to determine the predetermined set of unused IP addresses from a set of used IP address obtained from one or more relevant Domain Name Servers (DNSs).

20. The apparatus according to claim 18, where the processor is programmed to free the second IP address for further use in response to completion of the processing between the client application program and the selected instance of the server application program.

21. The apparatus according to claim 20, where the processor is programmed to free the second IP address in response to a request from the client application program.

22. The apparatus according to claim 15, where the IP network and addresses are IP version 6 (IPv6) compliant.

23. An apparatus for providing access by a client application program over an Internet Protocol (IP) network to a server application program instance comprising:

a communication interface; and a processor programmed to:

connect to a selected one of a plurality of instances of a server application program via a common port for a first IP address via the communication interface;

request a second IP address from the selected server application program instance, the second IP address being exclusive to the selected server application program instance;

in response to receipt of the second IP address, close the connection with the selected server application program instance; and reconnect to the selected instance of the server application program via the second IP address.

24. The apparatus according to claim 23, where the processor is further programmed to:

request that the selected server application program instance free the second IP address in response to completion of processing with the selected server application program instance.

25. An apparatus for a server application program instance to provide a connection for a client application program over an Internet Protocol (IP) network comprising:

a communication interface; and a processor programmed to:

monitor a port for a first IP address in common with a plurality of other instances of a server application program via the communication interface;

in response to a first request from the client application program, connect to the client application program via the first IP address to provide a first connection;

in response to a second request from the client application program, acquire a second IP address exclusive to the server application program instance and communicate the second IP address to the client application program;

in response to a third request from the client application program, close the first connection;

monitor a port for the second IP address; and in response to a fourth request from the client application program, reconnect to the client application program via the second IP address.

* * * * *